United States Patent
Schmidt

(10) Patent No.: US 6,892,121 B2
(45) Date of Patent: May 10, 2005

(54) SYSTEM FOR CONTROLLING THE OPERATION OF MODULES USING INFORMATION TRANSMITTED FROM A CONTROL DEVICE VIA A DATA BUS, A TRIGGER DEVICE AND A TEST CIRCUIT

(75) Inventor: Claus Schmidt, Regensburg (DE)

(73) Assignee: Siemens Aktiengesellschaft, Munich (DE)

( * ) Notice: Subject to any disclaimer, the term of this patent is extended or adjusted under 35 U.S.C. 154(b) by 277 days.

(21) Appl. No.: 10/149,673

(22) PCT Filed: Dec. 12, 2000

(86) PCT No.: PCT/DE00/04410

§ 371 (c)(1),
(2), (4) Date: Jun. 13, 2002

(87) PCT Pub. No.: WO01/45321

PCT Pub. Date: Jun. 21, 2001

(65) Prior Publication Data

US 2003/0225461 A1 Dec. 4, 2003

(30) Foreign Application Priority Data

Dec. 14, 1999 (DE) .......................... 199 60 261

(51) Int. Cl.$^7$ ................ B60R 21/00; B60R 21/32
(52) U.S. Cl. ............. 701/45; 280/735; 280/806; 180/282; 340/436; 307/10.1
(58) Field of Search .................. 701/36, 45, 46, 701/42, 43, 29; 280/735, 728.1, 734, 806, 741; 180/282, 281, 268, 274, 446, 280, 271; 307/10.1, 9.1, 10.6; 340/436, 438, 479, 459, 463, 464, 500, 310.01, 669; 700/1; 73/514.26

(56) References Cited

U.S. PATENT DOCUMENTS

| | | | | |
|---|---|---|---|---|
| 4,371,910 A | * | 2/1983 | Bube et al. ................ | 361/106 |
| 5,122,954 A | * | 6/1992 | Okano ....................... | 701/46 |
| 5,564,737 A | * | 10/1996 | Ito et al. ..................... | 280/735 |
| 5,760,353 A | * | 6/1998 | Rapp ......................... | 200/17 R |
| 5,779,264 A | * | 7/1998 | de Mersseman et al. ... | 280/735 |
| 5,787,377 A | * | 7/1998 | Watanabe et al. ............ | 701/45 |
| 5,806,008 A | * | 9/1998 | Takeuchi ..................... | 701/45 |
| 5,884,203 A | * | 3/1999 | Ross .......................... | 701/45 |
| 5,964,816 A | | 10/1999 | Kincaid ....................... | 701/45 |
| 6,628,007 B1 | * | 9/2003 | Baumgartner .............. | 307/10.1 |

FOREIGN PATENT DOCUMENTS

| | | |
|---|---|---|
| DE | 44 04 892 A1 | 8/1995 |
| DE | 196 09 076 C1 | 8/1997 |
| DE | 197 39 808 A1 | 3/1999 |
| DE | 197 40 021 A1 | 3/1999 |
| GB | 2271874 A * | 4/1994 ........ B60R 21/32 |

* cited by examiner

Primary Examiner—Thomas G. Black
Assistant Examiner—Tuan C To
(74) Attorney, Agent, or Firm—Morrison & Foerster LLP

(57) ABSTRACT

In a data communication system, data is transmitted from a control device to a communication interface and from there via a communication bus to additional communication interfaces of trigger devices. The communication interface on the control device side has inputs, to which signals from said control device and a disarming switch can be assigned. The disarming switch can be circumvented by a bypass switch which is controlled by the control device. The state of the signal at the inputs of the communication interface on the control device side is transmitted to coresponding outputs of the communication interfaces of the triggger devices. A trigger device has a safety unit which is used to test at least one trigger unit, when the state of the signal of the outputs authorizes such a test and the trigger voltage source is not yet charged wth the full trigger voltage. In said state, the safety unit also blocks triggering as soon as the trigger voltage has been reached. The inventive system ensures a high degree of functional safety and flexibility.

14 Claims, 2 Drawing Sheets

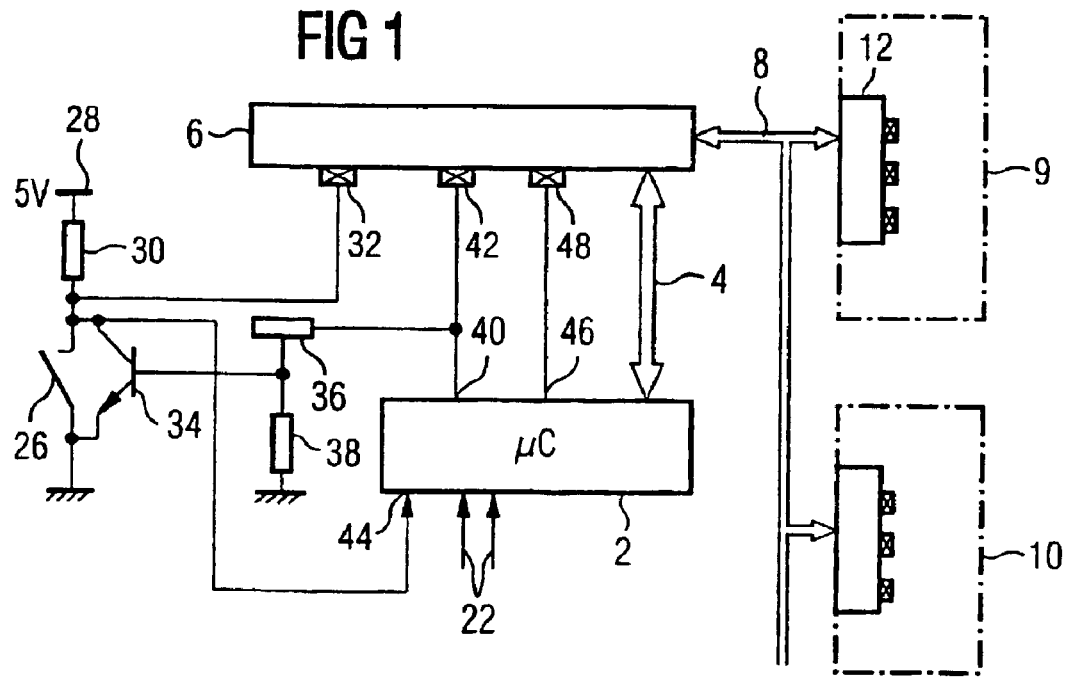
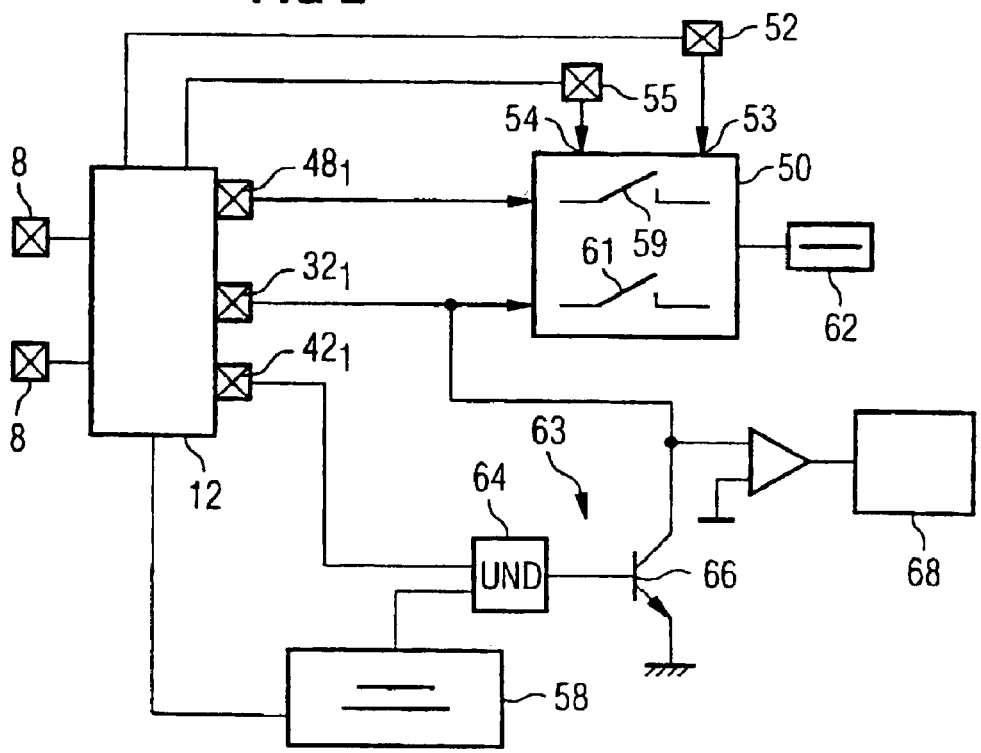

SYSTEM FOR CONTROLLING THE OPERATION OF MODULES USING INFORMATION TRANSMITTED FROM A CONTROL DEVICE VIA A DATA BUS, A TRIGGER DEVICE AND A TEST CIRCUIT

CLAIM FOR PRIORITY

This application is a national stage of PCT/DE00/04410, published in the German language on Jun. 21, 2001, which claims the benefit of priority to German Application No. DE 199 60 261.1, filed on Dec. 14, 1999.

TECHNICAL FIELD OF THE INVENTION

The invention relates to a system for controlling the operation of modules by transmitting information from a control device via a databus, and in particular for controlling the operation of firing devices of a vehicle occupant protection apparatus in a motor vehicle. The invention also relates to a firing device for connection to the communications bus of such a system and a safety circuit for a firing device of a vehicle occupant protection system.

BACKGROUND OF THE INVENTION

A conventional system is disclosed in DE 197 39 808 A1. In this system, the code words which are transmitted from the control device to the communications interface contain an information section and an error-detection section which contains, for example, the sum of bits of the information section. The information packet contains a bit which corresponds to the presence or non-presence of a safing signal generated by a safing switch or safing sensor. If the code word transmitted by the control device is to fire firing devices of a motor vehicle occupant protection system, it contains, at a predetermined place in the information packet, a bit which corresponds to the presence of the safing signal, i.e. requires the safing switch to be closed. This information bit is replaced in the communications interface by the information relating to the safing signal which is actually present at the safing input so that, for example when there is information contained in the code word relating to the closed safing switch but when there is an absence of the safing signal at the safing input of the communications interface, the sum value in the code word no longer corresponds to the sum of the information packet and the code word can be detected as faulty, as a result of which the firing devices do not fire.

In the known system, the safing signal which is present at the safing input thus permits a safing function to be integrated into airbag firing systems which operate with bus systems. When the safing switch is opened, firing is reliably prevented. However, in the known system, it is not possible to distinguish between firing instructions for different firing devices, for example firing devices for side airbags and firing devices for front airbags. Furthermore, all the firing devices can be fired only if the safing switch is closed.

SUMMARY OF THE INVENTION

The invention discloses developing a system in such a way that a large degree of flexibility and reliability in terms of the actuation capability of the individual modules is provided.

In one embodiment of: the system according to the invention, at the control-device-end communications interface, a plurality of inputs whose signal assignment is transmitted to corresponding outputs of the module-end communications interface, information is present at the module end which can be used in a wide variety of ways to enable and disable functions which are to be triggered by means of the data transmitted by the control module. In this way, flexible actuation of the individual module is possible. The transmission of the transmitted data and the information in the code words can be protected in a similar way to that in the method according to DE 197 39 808, mentioned at the beginning, check bits contained in the code words for checking the correctness of the information both increasing the reliability of the transmission and enabling faults of the control device to be detected. The number of inputs of the control-device-end communications interface to which signals can be applied can be different from the number of the module-end communications interface.

In one aspect of the invention, it is possible to enable functions of the modules as a function of the switch state of the safing switch.

In another aspect of the invention, the modules can advantageously be addressed selectively by means of module-specific codes, as a result of which the flexibility and reliability of their actuation capability is increased further.

In another embodiment of the invention, a signal state is brought about which corresponds, on the one hand, to the closed safing switch, as a result of which specific functions are enabled, and which corresponds, on the other hand, to the safing switch closed by means of a test signal, and in addition to the presence of a test signal, as a result of which functions, in particular test functions in which one or more modules are in the same enabled state as in the case of a closed safing switch, can take place.

The test output, in another aspect of the invention, of the module-end communications interface permits selective execution of functional scopes, irrespective of the state of other outputs which are present.

In still another aspect of the invention, there is a way of triggering the individual safety devices for a vehicle occupant protection system of a vehicle which is suitable for practical conditions.

In yet another aspect of the invention, there is a large degree of reliability of the triggering of the safety devices to be triggered in the event of a front-end impact against malfunctions of the control device. In addition, as is explained further below, the safety devices which are to be triggered in the event of a front-end impact can be checked.

In still another an embodiment of the system, no separate test input of the control-device-end communications interface is provided.

In one aspect of the invention, additional functional reliability advantages to be obtained by virtue of the fact that, for example, a firing signal is generated in the control device if the safing input has experienced a level change.

In still another aspect of the invention, the basic design of a first advantageous embodiment of a firing device for connection to the communications bus: of the system according to the invention. The embodiment of the firing device according to the invention ensures that a plurality of identical firing devices, embodied as what are referred to as "smart squibbs", can be connected to the communications bus and selectively triggered.

In another embodiment, a firing device with whose safety circuit it is possible to carry out functional checking as long as the firing voltage source is still not charged to its firing voltage. If a test signal is present at the same time as a control signal, firing of the firing device is prevented.

According to one aspect, the safety switch, which constitutes a central safety element of the system, is advantageously monitored.

The invention is suitable for all systems of the generic type in which slave modules are to be controlled by a master module via a databus as flexibly as possible and with a high degree of functional reliability. The invention is particularly suitable for use in vehicle occupant protection systems.

The invention is explained further below by way of example and with further details with reference to the darwings, in which:

FIG. 1 shows a block circuit diagram of a first embodiment of the system according to the invention.

FIG. 2 shows a block circuit diagram of a firing device.

DETAILED DESCRIPTION OF THE INVENTION

Figure 3:
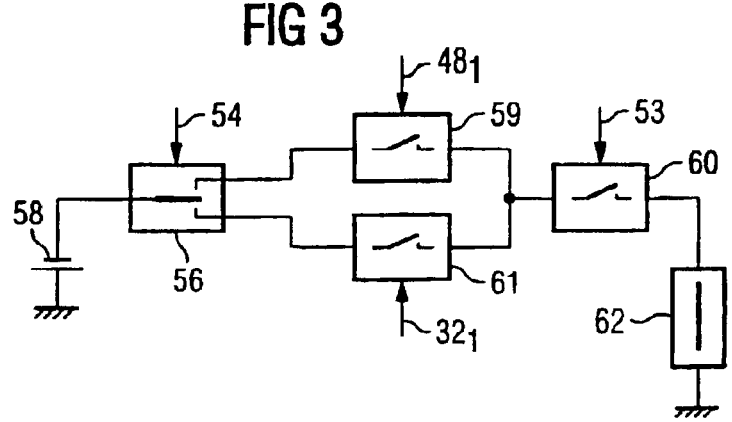
FIG. 3 shows a circuit diagram explaining the function of the firing device according to FIG. 2.

According to FIG. 1, a control device 2 of a vehicle occupant protection system is connected via a data line 4 to a communications interface 6 which is connected to firing devices 9, 10 via a communications bus 8. The firing devices are embodied as what are referred to as "smart squibbs" which have their own communications interface 12 and whose design is explained by reference to FIGS. 2 and 3. The system has a plurality of firing devices which are to be fired selectively on an individual basis or in groups in the event of a front-end impact, a side impact, a roll-over etc.

The control device 2 controls a microprocessor which has associated memories and which determines instructions and/or information from sensor input signals 22 which are generated by different acceleration sensors, said instructions and/or information being fed to the communications interface 6 via the data line 4.

In addition, a safing switch 26 which forms a redundancy switch and which closes by means of a predetermined vehicle deceleration so that, when the safing switch 26 is closed, current flows from a voltage source 28, with for example 5 volts, through a resistor 30 and the safing switch 26 so that a safing signal is present at a safing pin or safing input 32 of the communications interface 6 which is connected to the connection between the safing switch 26 and the resistor 30. In parallel with the safing switch 26 there is a normally open bypass switch 34 which is formed, for example, by a transistor and which is connected to a voltage divider circuit formed from two resistors 36 and 38 connected in series. The one resistor 38 is connected to ground and the other resistor 36 is connected to a test output 40 of the control device 2, which is in turn connected to a test input 42 of the communications interface 6.

The connection between the safing switch 26 and the resistor 30 is additionally connected to an input 44 of the control device 2.

The control device 2 also has a control output 46 which is connected to a further pin or a control input 48 of the communications interface 6.

The design and function of the individually described components and function blocks are known per se and are not explained.

The transmission of the information of the instructions of the control device 2 and of the signal states of the inputs 32, 42 and 48 which are sent via the data line 4 takes place in a manner known per se, it being possible for this data to be checked for correctness in a manner known per se by means of the division of the individual code words into information packets and check packets. If it is detected, for example, in the communications interface 6 that the input 42 has a signal applied to it, but this is not the case at the input 32, a fault in the system can be identified immediately by acknowledgement by the data line 4 to the control device 2. Furthermore, the control device 2 can be embodied, for example, in such a way that it sends a firing instruction for firing the firing device 18 or devices 18 only if a safing signal is present at its input 44. Furthermore, the transmission of a firing instruction can additionally be protected by the fact that a firing pulse is transmitted only after a signal change has been detected at the input 44 or at the input 32 without a signal change being present at the input 42.

If, for example in the case of test signal generated as a result of a fault in the control device 2, i.e. test input 42 with a signal applied to it, a firing signal is transmitted via the data line 4, this does not cause the firing device to fire as explained below because the test input 42 forms a DISABLE input. In this way, it is at least largely possible to prevent faults in the firing device 2 leading to inadvertent firing of a firing device.

The design of an advantageous exemplary embodiment of the firing devices 9, 10 which are advantageously embodied in the same way is described below with reference to FIG. 2.

The communications interface 12 which is connected to the communications bus 8 has a safing output $32_1$, a test output $42_1$ and a control output $48_1$. The code words which are transmitted via the communications bus 8 are each read out by the communications interface 12 in such a way that the signal state at the outputs $32_1$, $42_1$ and $48_1$, corresponds to the signal states at the inputs 32, 42, 48 of the communications interface 6.

In the firing device 16 there is a switching device 50 whose inputs are connected to the outputs $32_1$ and $48_1$. A firing signal output 52 of the communications interface 12, to which firing signal output 52 a firing signal sent by the control device 2 via the data line 4 is transmitted, is connected to a firing input 53. A code input 54 is connected to a code signal output 55 which conducts identification signals and code signals which are individually assigned to the firing devices and are transmitted by the control device 2.

The firing devices are each provided with an individual code, for example by programming a memory contained in them so that they detect a code signal which is respectively assigned to them.

The coding of a firing device can also be carried out by virtue of the fact that a resistor, at which a predetermined voltage drops when the code signal is present, is connected downstream of the code input 54, said voltage serving to activate a code switch. The presence or intactness of such a resistor can be checked from the control device 2, as a result of which the functional reliability of the system is further improved.

The further design and function of the switching device 50 is explained with reference to FIG. 3:

The input of a code switch 56 is connected to a firing voltage source 58. The code switch 56 has two outputs, of which one is connected to the input of a firing switch 60 via a control switch 56 which can be driven by the control output $48_1$, and the other is connected to the input of the firing switch 60 via a safing switch 61 which can be driven from the safing output $32_1$. The output of the firing switch 60 is connected to a firing unit 62, embodied for example as a firing cap.

The function of the switching device 50 which is described is such that the code: signal present at the input 54 defines the control-device-specific positioning of the code switch 56, i.e. whether the branch with the control switch 59 or the branch with the safing switch 61 is activated. When the control switch 59 is activated, a control signal which is present at the control output 48, leads to the closing of the control switch 59 so that a firing signal 53 which closes the firing switch 60 fires the firing unit 62 when the firing voltage source 58 is charged. On the other hand, when the safing switch 61 is activated, a signal at the safing output $32_1$ causes the firing output 62 to fire when there is a firing signal.

If a plurality of firing devices equipped with the control circuit 50 described are connected to the communications bus 8, it is therefore possible to determine by means of the code signal whether the firing devices are activated via the control output $48_1$ and/or the safing output $32_1$ so that they fire correspondingly.

An exemplary assignment is that firing devices which are activated via the control output $48_1$ are firing devices which fire when there is a side impact, whereas firing devices which are to fire in the event of a front-end impact are activated via the safing output $32_1$. The switches 59 and 61 thus constitute, in a certain way, safing switches which are assigned to a side impact or a front-end impact. In addition, the firing device contains a safety switching device 63 with an AND element 64 whose inputs are connected to the firing voltage source 58 and the test output $48_1$ and whose output is connected to the input of a safety switch 66 which is formed, for example, from a transistor. The safety switch 66 connects the safing output $32_1$ to ground when there is a signal from the AND element 64 so that a signal which is present at the safing output $32_1$ becomes ineffective for the switching device 50. In order to monitor the state of the safety switch 66 or of the safing output $32_1$, a monitoring device 68 is provided whose output signal is displayed immediately and/or can be sensed additionally by the control device 2.

The design and function of the individual assemblies or functional elements are known per se and are therefore not explained in particular.

The function of the safety device 63 is explained below. It is assumed here that, after the system is switched on, for example via the communications bus 8, the firing voltage source 58 is gradually charged to the firing voltage.

The safing output $32_1$ may have a safing signal (front-end impact) applied to it so that when there is a corresponding code the switch 61 is closed and the firing unit 62 fires when there is a firing signal if the test output $42_1$ does not have a signal applied to it. However, if a test signal is present and the firing voltage source 58 is charged to its firing voltage, the AND element 64 supplies an output signal, as a result of which the safety switch 66 closes and connects the safing output 32, to ground, as a result of which in turn the switch 60 is prevented from closing. A test signal thus constitutes an ENABLE signal in terms of the firing. If the firing voltage source 58 has still not reached the firing voltage after the system is put into operation (the firing voltage source 58 contains a charging capacitor), the AND element 64 does not supply an output signal because there is inequality between the voltage at the test output $42_1$ and the voltage of the firing voltage source 58 in this state. It is in any case impossible for the firing device 18 to fire with inadequate voltage. However, by using a firing pulse or test pulse generated by the control device it is possible to test the firing unit 68 because the switches 56, 61 and 60 bring about a current path from the voltage source 58 to the firing unit 62.

If a plurality of firing devices are connected in accordance with FIG. 2 to the communications bus 8 in FIG. 1, a vehicle occupant protection system can thus be brought about in which a number of firing devices (closed switch 61) fire only when there is a front-end impact (safing output $32_1$), and other firing devices (switch 59 closed) fire when there are impacts other than front-end impacts, the firing of said firing devices being secured via the control output $48_1$. The control devices which fire when there is a front-end impact can be additionally checked in terms of their function using the test output $32_1$, firing being reliably prevented when there is a functional check.

It goes without saying that the system described can be changed in different ways. For example, it is not absolutely necessary to integrate a firing-device-specific identification; however, it increases the flexibility of the system because firing devices can be addressed selectively. The switching device 50 can contain a plurality of switches so that it is possible, for example, to fire all the firing devices in the case of a front-end impact, whereas only respectively assigned firing devices are fired in the case of other impacts. Alternatively, it is also possible to use other firing devices which are connected to a common communications interface 12.

The firing input 53 can be dispensed with if the firing signal comes directly via the output $48_1$ or $32_1$ and closes corresponding switches which connected the firing voltage source to the firing unit.

Figure 4:
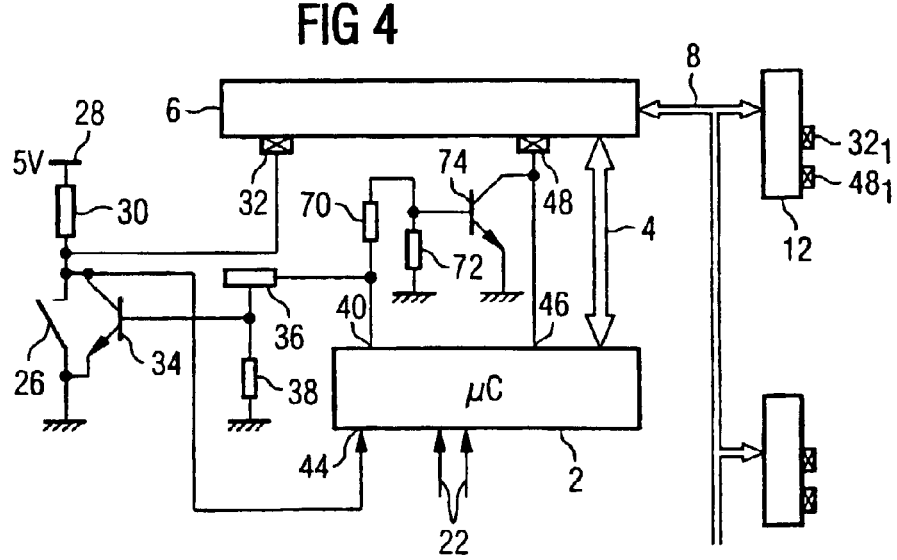
FIG. 4 shows a block circuit diagram of a second embodiment of the system.

It goes without saying that the block circuit diagram in FIG. 2 is also schematic and can be modified in various ways. For example, a plurality of firing units may be provided per firing device. FIG. 4 shows a modified embodiment of the system according to FIG. 1, the same reference symbols being used for functionally similar parts.

The essential difference from the embodiment according to FIG. 3 and that according to FIG. 1 is that in the embodiment according to FIG. 3 the test input 42 is absent and in its place the test output 40 is connected via a further voltage divider circuit with resistors 70 and 72 to a switch 74 which is formed, for example, by a transistor, can be actuated electronically and is connected to the control input 48.

The circuit ensures that when a test pulse generated by the control device 2 is present at the test output 40 or when there is a pulse at the output 40 (which does not necessarily need to be a test output) for closing the switches 34 and 74 at the inputs 32 and 48, in each case the same voltages or signals are present as when the safing switch 26 closes or when there is a control signal present at the control output 46.

With only two pins or inputs 32 and 48 of the communications interface 6 to which corresponding outputs $32_1$ and $48_1$ of the decoding device 10 correspond, it is possible to secure four functional scopes, for example according to the following table:

| State | Safing input 32 | Control input 48 | Enabling/disabling |
|---|---|---|---|
| I | 0 | 0 | Enabling test Firing in case of front-end impact |
| II | 0 | 1 | Enabling firing in case of non-front-end impact |
| III | 1 | 0 | Disabling of firings |
| IV | 1 | 1 | Enabling of firings |

As is apparent, the firing device or devices which are assigned to a front-end impact can be tested and the firing device or devices which are not assigned to a front-end impact can be fired independently of the firing devices to be fired in the event of a front-end impact. The output 40 in the embodiment according to FIG. 3 is therefore not a test output in the true sense but rather an additional control output with which functions can be disabled or enabled.

The circuit of the firing device or devices is correspondingly embodied so that the corresponding functions can be disabled or enabled with the signal states explained in table 2 at their outputs $32_1$ and $48_1$.

It goes without saying that the circuits which are explained by way of example can be modified in various ways if only the essential ideas of the invention are implemented, i.e. the generation of signal states at the control-device-end communications interface 6 which are transmitted via the communications bus 8 to the communications interface 12 and are available there for disabling or enabling functional states which are triggered by means of corresponding instructions.

An input of the control-device-end communications interface is connected to a safing switch, it being possible to bypass the safing switch by means of a bypass switch which can be driven by an output of the control device. The output of the safing switch is connected to an input of the control device, it being possible, in contrast to the embodiments illustrated, for this input to be inverting, i.e. to have the voltage zero applied to it when the safing switch is closed.

An output-end control device has a device with which it is possible to test a firing device with predetermined application of signals to the outputs of the firing-device-end communications interface as long as the voltage source has not yet reached its firing voltage, and in the state in which the test capability is enabled the firing capability is automatically disabled as soon as the voltage source has reached its firing voltage.

Alternatively, the communications interface of the firing devices can, as shown in FIG. 2, be embodied with three outputs, and the applications of signals to the inputs 32 and 48 of the control device of FIG. 4, which are transmitted via the communications bus, can be converted into the following applications of signals by appropriately embodying the communications interface 12:

| | K-interface 6 (FIG. 4) | | K-interface 12 (FIG. 2) | | |
|---|---|---|---|---|---|
| State | 32 | 48 | $32_1$ | $48_1$ | $42_1$ |
| I | 0 | 0 | 1 | 0 | 1 |
| II | 0 | 1 | 1 | 1 | 0 |
| III | 1 | 0 | 0 | 0 | 0 |
| IV | 1 | 1 | 0 | 1 | 0 |

As a result, with the embodiment of the control device and of the circuits connected downstream of it according to FIG. 1 and the embodiment of the firing device according to FIG. 2 it is possible to carry out all the functions explained in conjunction with these figures.

Only two additional bits included in the code words have to be transmitted via the communications bus, said bits corresponding in each case to one of the inputs 32 and 48 and their signal state being as indicated in the table above. The information contained in the (control and signal) bits is converted in the communications interface 12 into the application of signals to the outputs $32_1$, $48_1$ and $42_1$ which is indicated in the table.

What is claimed is:

1. A system for controlling the operation of modules by transmitting information from a control device via a databus, comprising:

a communications interface which is connected to the control device via a data line and has an input, which communications interface converts data transmitted by the control module into code words which are transmitted via a communications bus and which includes information relating to the data and a signal state of the input, wherein the communications interface connected to the control device has a plurality of inputs to which signals are configured to be applied, and the communications bus is connected to the modules via a module-end communications interface which has a plurality of outputs to which signals are configured to be applied, the signal state of the inputs being transmitted to the outputs via the communications bus such that there is a predetermined relationship between the signal states of the inputs and outputs, such that functions of the modules are disabled and enabled by means of the signal states of the inputs.

2. The system as claimed in claim 1, wherein the communications interface which is connected to the control device has a safing input which is connected to a safing switch and a control input which is connected to a control output, to which a control signal can be applied, of the control device and in that that the communications bus is connected to the modules via a module-end communications interface which has a safing output and a control output, the signal state of the safing input or of the control input being available at the safing output or the control output to disable or enable functions of the modules.

3. The system as claimed in claim 1, wherein the modules can be addressed selectively by means of a code.

4. A system for controlling the operation of modules by transmitting information from a control device via a databus, comprising:

a communications interface which is connected to the control device via a data line and has a sating input connected to a safing switch, which communications interface converts data transmitted by the control module into code words which are transmitted via the communications bus and which include information relating to the data and a signal state of the safing input, wherein the control devices has a test output to which a test signal is configured to be applied from the control device and which is connected to a further input of the communications interface, and a bypass switch is provided parallel to the safing switch such that when the test signal generated by the control device is present a signal state corresponding to the closed safing switch is present at the safing input irrespective of the switch state of the safing switch, and the communications bus is connected to the modules via a module-end communications interface which has a safing output and at least one further output, the signal state of the safing input or of the further input being available at the safing output or further output to disable or enable functions of the modules.

5. The system as claimed in claim 4, wherein the test output of the control device is directly connected to a test input of the communications interface, and the further output of the module-end communications interface is formed by a test output.

6. The system as claimed in claim 5, wherein safety devices which trigger when there is a front-end impact are configured to be triggered when the safing switch is closed and safety devices which trigger when there is a side impact are configured to trigger when the safing switch is open.

7. The system as claimed in claim 6, wherein when a test signal is present the triggering capability of the safety devices which trigger when there is a front-end impact is disabled.

8. The system as claimed in claim 4, wherein the control input is connected to the test output via a switching device such that when there is a test signal present a signal state which corresponds to the presence of a control signal is present at the control input.

9. The system as claimed in claim 8, wherein the following relationships exist between the signal states at the inputs of the control-device-end communications interface and the possibility of enabling or disabling functions:

when the safing input and control input equal 0, enabling firing in the event of front end impact, when the safing input equal 0 and the control input equals 1, enabling firing in the event of non-front-end impact, when the safing input equal 1 and the control input equals 0, disabling firings, and when the safing input equal 1 and the control input equals 1, enabling all firings.

10. The system as claimed in claim 9, wherein the control-device-end communications interface transmits the signal state of its inputs to the control device.

11. A firing device for connection to the communications bus of a system as claimed in claim 3, wherein the communications interface which is configured to be connected to the communications bus and has a safing output, the control output, a code signal output with a firing signal output, a switching device which has a safing switch which can be activated by the safing output, a control switch which can be activated by control output, a code input with a firing input, a firing-device-specific code signal present at the coding input determining which of the switches is activated, and a firing signal leading to firing of a firing unit when the safing switch is activated and a safing signal is present and/or control switch is activated and/or a control signal is present, and a safety circuit with an AND element whose inputs are connected to the test output and to the firing voltage source and whose output is connected to a safety switch which connects the safing output to ground if a test signal is applied to the test output and the firing voltage source has a voltage which is not sufficient to fire the firing unit.

12. A firing device for connection to the communications bus of a system as claimed in claim 5, wherein the communications interface which can be connected to the communications bus and has the safing output, the test output, a safing switch which can be activated by the safing output and which connects a firing voltage sources to a firing unit when there is a signal at the safing output and a firing signal is present, and a safety circuit with an AND element whose inputs are connected to the test output and to the firing voltage source and whose output is connected to a safety switch which connects the safing output to ground if a test signal is applied to the test output and the firing voltage source has a voltage which is not sufficient to fire the firing unit.

13. The system as claimed in claim 11, wherein a monitoring device for the safety switch is provided.

14. A safety circuit for a firing device of a vehicle occupant protection system, comprising:

an input to which a signal can be applied and a test input to which a test signal can be applied; and an AND element having inputs connected to the test output and to a firing voltage source and having an output connected to a safety switch which connects the input to ground if a test signal is applied to the test output and the firing voltage source has a voltage which is not sufficient to fire the firing unit.

* * * * *